United States Patent [19]
Jones

[11] 3,817,398

[45] June 18, 1974

[54] NUCLEAR POWER CASK HANDLING SYSTEM

[75] Inventor: Cecil Roy Jones, Orange, Conn.

[73] Assignee: Transfer Systems Incorporated, North Haven, Conn.

[22] Filed: Jan. 22, 1973

[21] Appl. No.: 325,646

[52] U.S. Cl.................... 212/98, 212/145, 187/25
[51] Int. Cl............................................. B66c 21/00
[58] Field of Search.......... 212/145, 98; 187/24, 25, 187/77, 78

[56] References Cited
UNITED STATES PATENTS

| | | | |
|---|---|---|---|
| 307,985 | 11/1884 | Phyfe et al.............................. | 187/78 |
| 652,301 | 6/1900 | Stokes................................... | 187/25 |
| 1,032,320 | 7/1912 | Armstrong............................. | 187/78 |
| 2,802,549 | 8/1957 | Izquierdo et al...................... | 187/25 |

Primary Examiner—Richard E. Aegerter
Assistant Examiner—Hadd S. Lane

[57] ABSTRACT

A cask-handling system for a nuclear power station is described. The cask is employed to carry nuclear fuel elements to and from a storage depot within the station via a hatch in the station. The cask is lifted through the hatch by means of an overhead crane. The invention provides an independent second load path for the cask during its transit through the hatch. The second load path is provided by a strongback coupled to the crane and to the cask and adapted to be selectively coupled and uncoupled to a vertical support structure in the hatch.

12 Claims, 6 Drawing Figures

PATENTED JUN 18 1974　　　　　　　　　　3,817,398

NUCLEAR POWER CASK HANDLING SYSTEM

This invention relates to an improved cask handling system especially adapted for handling a cask containing fuel elements or assemblies for a nuclear reactor power station.

One popular form of known reactor power station comprises a reactor building housing a reactor well containing a reactor pressure vessel adjacent a fuel storage pool and both extending down from a refueling floor of the building. The fuel elements for the reactor are typically in the form of thin elongated rods packed with radioactive pellets and joined in large groups to form assemblies. The storage pool is used to store spent elements awaiting shipment to a fuel reprocessor, and fresh elements received from the fuel reprocessor to be used to replace spent or leaking elements in the reactor core. The customary manner for shipping the radioactive fuel elements to and from the reprocessor is within a heavy shielding cask constructed of a good radiation shielding material such as lead and usually filled with liquid from the pool. The cask, commonly called the refueling cask, is extremely heavy.

In a typical procedure, the refueling cask is received through a lock in the reactor building at a level well below the refueling floor. It is lifted by a overhead crane through a hatch located about 80 feet below the refueling floor to the latter, transferred over the refueling floor to the fuel storage pool, lowered in the fuel pool, the cask head removed, the fresh fuel removed and spent fuel inserted, the head installed, and the cask then removed back out through the hatch to a transport vehicle for shipment to the reprocessor.

If the overhead crane should fail and the loaded cask drop during the lift of 80 feet, it could cause serious damage to the reactor building with subsequent release of radiation to the environment.

The main object of the invention is to provide a cask handling system which will prevent a dropping of the cask in the event of failure of the overhead crane.

This is achieved in accordance with the invention by providing for the cask during its transit through the hatch a second load path that is completely independent from that of the overhead crane. In accordance with a preferred embodiment of the invention, a vertical support structure is provided within the hatch. A strongback member is provided for supporting the cask, and in turn is adapted for attachment to the crane hoist. Means are provided for coupling the strongback to the vertical support structure such that the strongback and support structure provide an independent load path for the cask capable of supporting the cask in the absence of the overhead crane. Means are provided for raising and lowering the strongback with respect to the vertical support structure.

Other features of the invention include means for selectively engaging and disengaging the strongback from the support structure, and means for synchronizing the strongback vertical motion along the support structure with the vertical movement of the overhead crane.

These and other features and advantages of the invention will be better understood from the following detailed description of one exemplary embodiment thereof taken in conjunction with the accompanying drawings, wherein.

Figure 1:
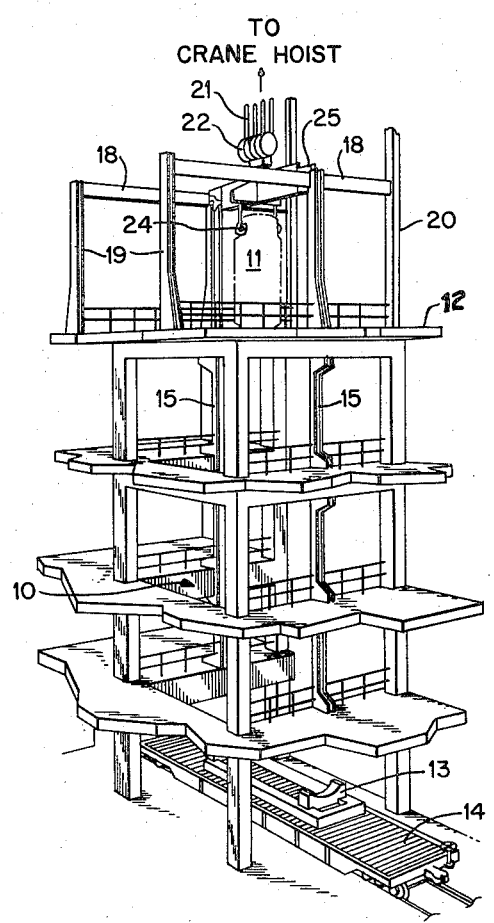
FIG. 1 is a perspective view of one form of the cask-handling system in accordance with the invention shown in position in a reactor station.

Referring now to the drawings, FIG. 1 illustrates the part of the reactor building containing a hatch 10 whereby a cask 11 (shown in phantom) can be brought into the building and lifted to the refueling floor, which is designated 12. Off to the left of FIG. 1 extending down from the refueling floor 12 would be located the fuel storage pool and adjoining reactor well (which are not shown). Typically, the cask would be brought into the reactor building supported horizontally on a cradle 13 on a railway car 14 or like transport vehicle.

Extending vertically through the hatch 10 from above the refueling floor 12 down to the vicinity of the transport vehicle 14 is a vertical support structure including a pair of opposed vertically extending hollow channel members 15 of, for example, structural steel. These channel members 15, which have a generally square cross-section (FIG. 3), each enclose an elongated fixed screw 17 which extends the full length of the channel 15. As will be noted, the channel supports extend a distance above the refueling floor 12 somewhat greater than the height of the cask 11, and are there supported by a frame comprising horizontal load-bearing beams 18 supported on the refueling floor by vertical beams 19 and 20.

Figure 2:
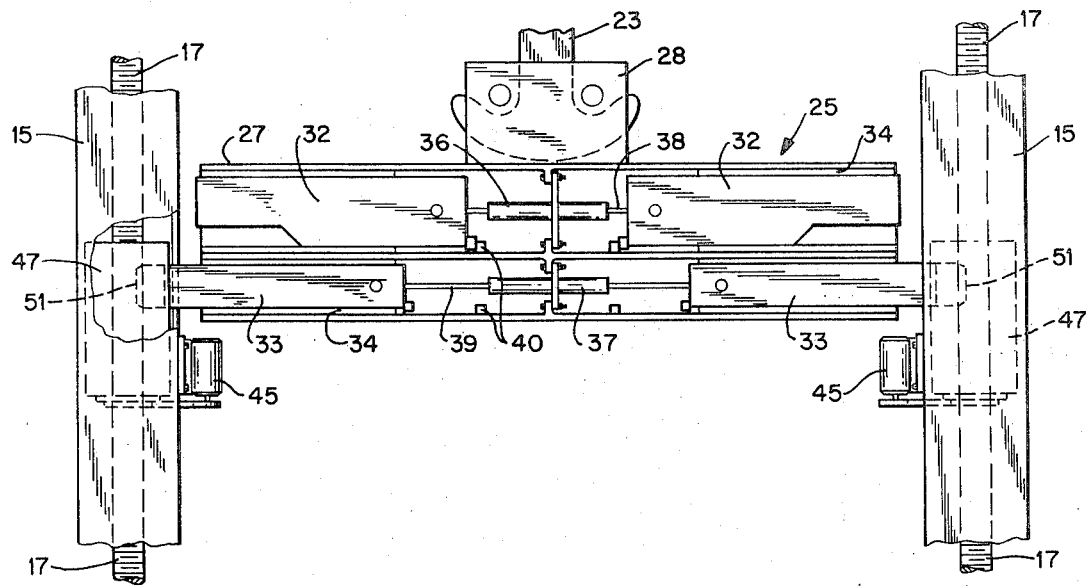
FIG. 2 is a partly elevational, partly cross-sectional view with the sides partly removed to exposed the interior of the cask strongback and adjacent channels with the strongback engaged to the blocks.

Located above the hatch is the usual overhead crane hoist from which extends the usual multiple cables 21 coupled to a sheave 22 from which depends a hook 23 (FIG. 2). As is well known the hook and sheave can be selectively lowered and raised under operator control.

Figure 6:
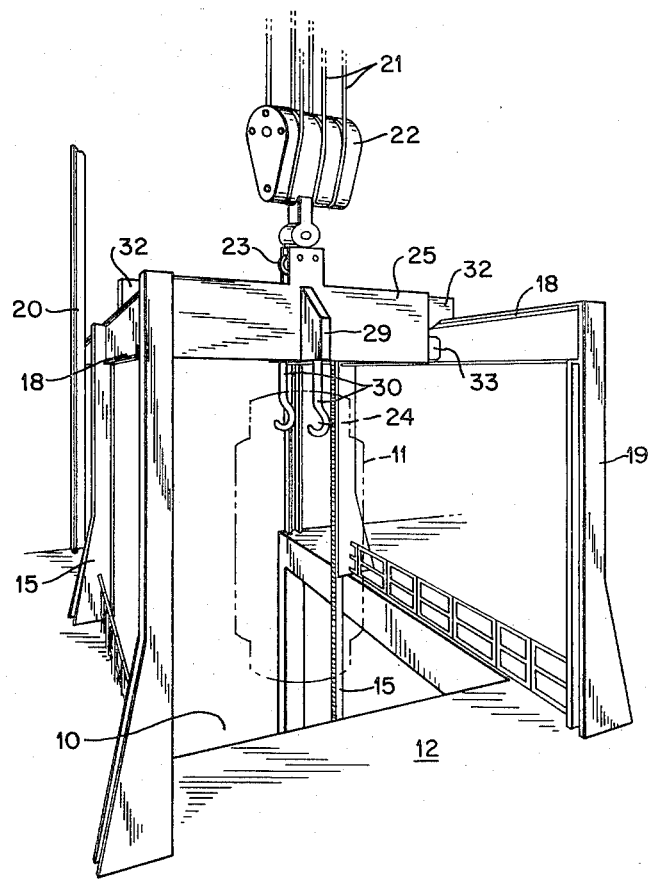
FIG. 6 is a perspective view of the system of FIG. 1 with the strongback disengaged from the channels.

In the prior art, the hook 23 was coupled to a sling which in turn hooked to opposed cask support lugs 24. In the inventive construction, however, the hook 23 is coupled to a strongback 25, which comprises a horizontally extending beam support structure 27 containing a projection 28 for attachment to the sheave hook 23, and opposed side projections 29 from which depend auxiliary hooks 30 for attachment to the cask (see FIG. 6). The strongback 25 further contains on its interior two pairs of extension members, an upper pair 32, and a lower pair 33. Each pair comprises at opposite ends a structural member slidable within suitable liner bearings 34 from a first interior position wherein its free end is within or only slightly protrudes from the beam support 27, to a second exterior position wherein its free end protrudes laterally outwardly a substantial distance from the beam support. Various known means may be employed to achieve the required lateral motion. A preferred way, which is illustrated, employs air or hydraulic cylinders 36, 37 comprising a piston end 38, 39, respectively, connected to the interior end of each movable extension, and under operator control, or automatically, are capable of causing selective extension or retraction of each of the upper 32 and lower 33 extension members. The limit of outer movement is determined by the piston length, and the limit of inward movement may be determined by suitable stops as shown at 40. FIG. 2 shows the upper extension members 32 in the retracted position, and the lower extension members 33 in the extended position. FIG. 6 illustrates the reverse situation. The lower extension members 33 are employed to selectively engage and disengage from the vertical screws 17, and the upper extension members 32 function as a strongback support when the cask reaches the peak of its vertical movement or is moved horizontally over the refueling floor.

Figure 3:
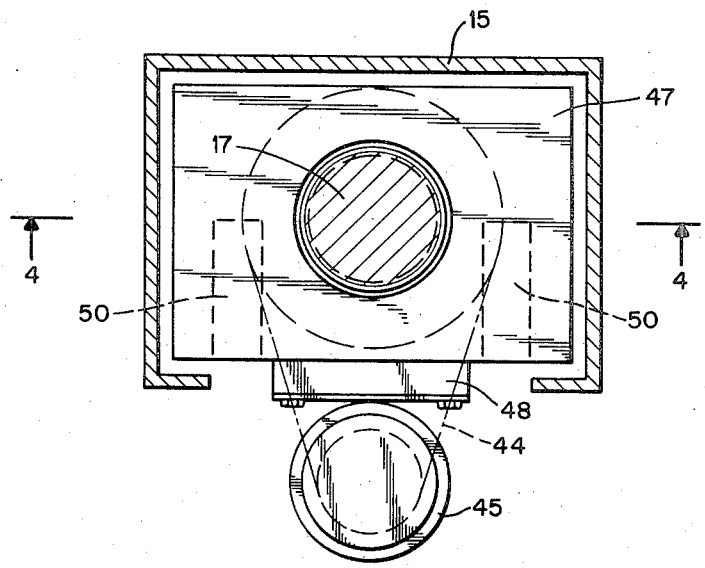
FIG. 3 is a cross-sectional view through one of the channels just above the block.
Figure 4:
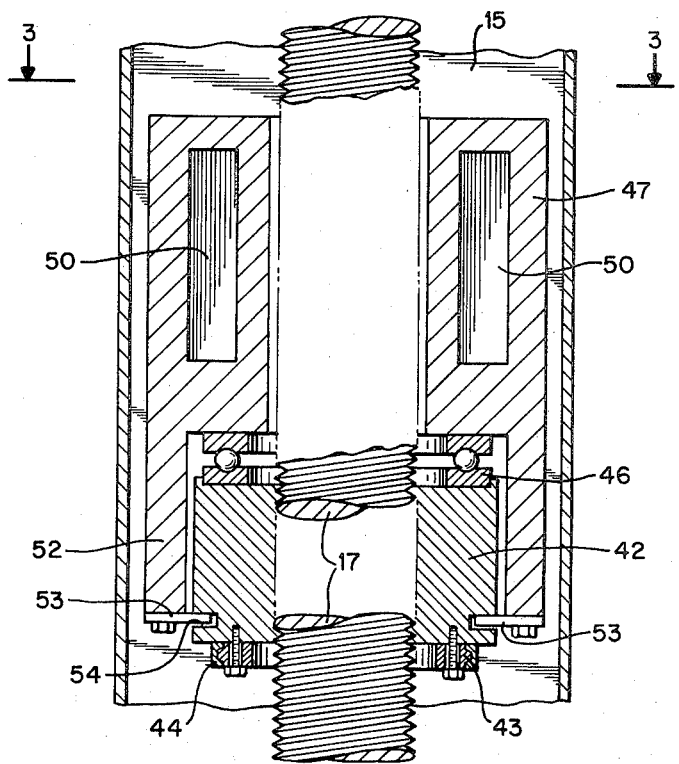
FIG. 4 is a cross-sectional view along the line 4—4 of FIG. 3.

The disengageable coupling of the strongback 25 to the vertical screws 17 can be effected in various ways. A preferred way is as follows. As shown in FIGS. 3 and 4, on each of the fixed screws is threaded a nut 42. Secured to the bottom of the nut is a suitable sprocket or gear 43 engageable by a chain 44 or like drive which in turn is driven by a motor 45. Seated on the nut top is a suitable bearing 46, which in turn supports a hollow block member 47, which as shown in FIGS. 3 and 4 is spaced from the screw 17. The block 47 has a square exterior shape and fits within the square channel 15 with a small clearance which prevents rotation of the block but permits free vertical movement within the channel. The motor 15 in turn is mounted on a support 48 on the front of the block, and its chain drive 44 extends just under the bottom of the block. The construction illustrated is the same for both channels 15.

Figure 5:
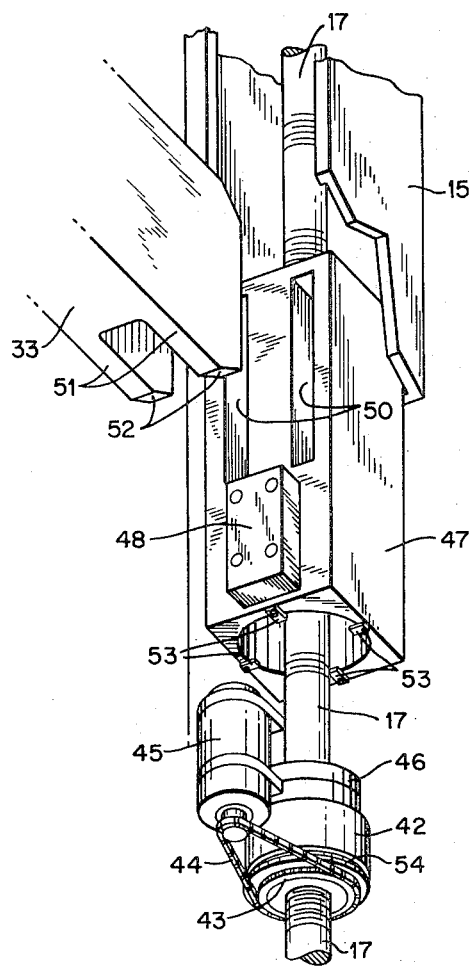
FIG. 5 is an exploded view of the channel, block, nut and motor showing the relative relationship of these parts.

The block 47 contains spaced slots 50 for receiving bifurcated ends 51 of the lower strongback extensions 33. The extensions ends 51 are beveled as shown at 52 (FIG. 5) for ease of engagement with the block and to seat the extensions firmly within the block receiving slots 50. As shown, each block 47 with the attached motor 45 is supported by its associated nut 42, and the intermediate bearing 46 permits rotation of the nut 42 without rotation of the block 47. As the nut rotates, it will be displaced vertically upward for one rotation direction and vertically downward for the opposite rotation direction. The motor 45 is controlled to cause vertical motion of the nut 42 at a speed slightly greater than the vertical motion of the crane hook 23. The motor 45 is of a type well known in the art as an air or hydraulic stalled motor, and is chosen to have a power incapable of alone displacing the loaded strongback 25, and thus, when energized and in the absence of the overhead crane, the motor will stall without any detrimental effects. However, as soon as the load 11 is lifted by the hoist, the motor 45 will rotate the nut 42 causing displacement of the block 47 and the engaged strongback 25 at a rate slightly in excess of that of the hoist. This is readily achieved by simply having the motor run at a constant speed faster than that required to keep up with the maximum speed of the hoist. Thus, under normal operation, as the cask-loaded strongback is moved through the hatch, the motor will be periodically running and stalling as it runs ahead of or leads the slower hoist. When the strongback moves upward, the faster upward movement of the nut 42 is no problem, since the motor 45 is incapable alone of lifting the loaded strongback and will stall whenever it runs ahead of the hoist. However when the cask is descending, the motor-driven nut 42 is capable of running ahead of the hoist and thus separating itself and the bearing 46 from the block 47. This is prevented by the provision of means coupling the nut 42 to the block 47 without interfering with the nut rotation. In a preferred form, said coupling means includes a skirt portion 52 depending from the block 47 and containing at its bottom four small inward lug projections 53 which engage an annular slot 54 in the body of the nut 42. This coupling prevents separation of the nut from the block while allowing rotation of the nut relative to the non-rotatable block.

As will be evident from the foregoing description, when the lower extensions 33 of the strongback 25 are engaged to opposite blocks 47 in the opposite channels 15, a second independent load path for the cask 11 is established via the nuts 42 and the screws 17 in both channels 15. Thus, at all times while the cask is being lifted or raised through the hatch by the overhead hoist, back-up support for the loaded cask is provided. Should the hoist fail, such as by cable failure, the nut motors 45 will stall and the loaded cask 11 will remain supported on the screws 17 via its strongback 25 and thus cask dropping will be prevented.

In a normal lifting procedure, the cask strongback is used in conjunction with the overhead crane to rotate the cask from its horizontal position on the transit vehicle 14 to the vertical position. When the cask is in the vertical position, the lower extensions 33 are extended and inserted in the blocks 47. The motors 45 are turned on, and as the crane moves upward, the motor-driven nuts cause the blocks to follow the upward motion of the strongback. If the overhead crane is stopped at any time during passage of the cask through the hatch, the motors 45 stall because they are not sized with sufficient torque to provide more than a few hundred pounds of vertical force. After the cask has reached the peak of its upward travel, shown in FIG. 1, then the strongback 25 will be located substantially at the same level as the horizontal beam support structure 18 mounted on the refueling floor 12. In this position, the air-cylinder 36 for the upper strongback extensions 32 is energized and the upper extensions moved outwardly so as to extend above the horizontal beams 18. Then the air cylinder 37 is energized and the lower extensions 33 retracted thus disengaging the strongback 25 from the channel blocks 47. Now the strongback upper extensions 32 via the support structure 18-20 form the second load path protecting against cask dropping. Now the hoist can move the cask-loaded strongback horizontally toward the storage pool, as shown in FIG. 6. So long as the cask 11 remains over the hatch 10, and for a short distance beyond the hatch where if the hoist fails the cask may still pitch over into the hatch, a second independent load path is provided by the strongback extensions 32 while they remain over the horizontal beams 18 and until the cask exits from the structure. On its return path, the upper extensions 32 remain in their extended position until the lower extensions 33 reengage the nut-supported blocks 47. In their transit over the horizontal beam structure 18, generally the hoist will lift the strongback 25 until there is a small clearance between the upper extensions 32 and the top of the horizontal beams 18.

As will be appreciated from the foregoing, the invention provides a system for moving a loaded cask along a prescribed path during which at all times an independent second load path for the cask is provided. While the various operations described can be effected manually, the prescribed cask movement lends itself to automatic operation as will be obvious to those skilled in the art. For instance, when the lifted cask reaches the top 18 of the support structure, then suitably-located interlocks (not shown) can be activated that will automatically extend the upper strongback extensions 32 and next automatically retract the lower extensions 33. Also the energization and direction of rotation of the motors can be automatically synchronized with the vertical motion of the hoist.

While the invention has been described in connection with the provision of a second load path during transit of the cask through the hatch, it is not limited thereto, but can be applied to any part of the reactor station where cask movement is to be effected and safety requirements indicate the need for the protective system described herein. For example, in copendng application, Ser. No. 179,713, filed Sept. 13, 1971, a protective system is described for movement of the cask in and out of the fuel storage pool. The cask-handling system described herein can also be used in the fuel pool, with of course the necessary modifications to protect the parts which become immersed in the pool against corrosion.

While my invention has been described in connection with specific embodiments thereof, those skilled in the art will recognize that various modifications are possible within the principles enunciated herein and thus the present invention is not to be limited to the specific embodiments disclosed.

1. A cask-handling system comprising: a vertical support structure including a top horizontal member, an overhead hoist, a strongback structure including means for attachment to the cask and means for attachment to the overhead hoist, means on the vertical support structure for connecting to the strongback, means for lowering and raising the strongback connecting means on the vertical support structure, said means for lowering and raising the strongback connecting means including a screw on the support structure and a nut engaging the screw, said connecting means including a block member supported by the nut, means on the strongback for selectively coupling and uncoupling the strongback to the block member, and means on the strongback for selectively laterally extending a support member so as to extend over the top member of the support structure so as to be supported thereby.

2. A cask-handling system as set forth in claim 1 wherein the lowering and raising means for the strongback connecting means are adapted to operate in substantial synchronism with vertical movement of the overhead hoist.

3. A cask-handling system as claimed in claim 2 wherein the strongback connecting means lowering and raising means is adapted to operate at a speed slightly faster than the speed of lowering and raising of the hoist.

4. A cask-handling system as claimed in claim 3 wherein means are provided for preventing the nut from running away from the block member during lowering of the strongback.

5. A cask-handling system as claimed in claim 1 wherein the strongback lowering and raising means includes motor means for rotating the nut, said motor means being only capable of rotating the nut when the cask load has at least partially been removed from the nut.

6. A cask-handling system comprising: a vertical support structure including a vertically arranged screw, a strongback structure including means for attachment to the cask and means for attachment to an overhead hoist, screw-engaging means for movement up and down the screw when rotated and for coupling to the strongback, said strongback including upper and lower extension members, means for selectively extending the upper extension member to extend over the support structure to be supported thereby and for retracting same, and means for selectively extending and retracting the lower extension member to couple and uncouple the strongback from the screw-engaging means.

7. A cask-handling system for moving a cask along a first substantially vertical path and along a second substantially horizontal path which intersects the first vertical path at its upper end, comprisin; a support structure adjacent the first and second paths, a strongback including means for attachment to the cask and means for attachment to an overhead hoist to establish a first load path for the cask, and means for establishing a second independent load path for the cask during substantially its entire movement along the first vertical and second horizontal paths; said second load path establishing means comprising means on the support structure for connecting to the strongback, means for lowering and raising the strongback connecting means, means for selectively engaging the strongback to the strongback connecting means to provide the second load path during cask movement along the first vertical path and including means for selectively disengaging the strongback from the connecting means to enable movement of the strongback supported cask along the second horizontal path whereby the second load path would be interrupted and means for reestablishing a second load path to the support structure before disengagement of the strongback from the strongback connecting means during cask movement along the second horizontal path.

8. A cask-handling system as claimed in claim 7 wherein the support structure includes a vertically arranged screw, and screw-engaging means for movement up and down the screw when rotated and for supporting the strongback connecting means.

9. A cask-handling system as claimed in claim 8 wherein the screw-engaging means includes a nut and motor means for rotating the nut.

10. A cask-handling system as claimed in claim 9 wherein the means for connecting the strongback includes a non-rotatable block member supported by the nut, and means for maintaining the nut and block connected while the nut is rotated relative to the non-rotatable block.

11. A cask-handling system as claimed in claim 10 wherein the strongback comprises upper and lower extension means, said support structure comprising at its upper end a horizontal support member extending adjacent to said second horizontal path, means for selectively extending the lower extension means to engage the block member and for selectively retracting the lower extension means to disengage same from the block member, and means for selectively extending the upper extension means to extend over the support structure horizontal support member and for selectively retracting the upper extension means.

12. A cask-handling system as claimed in claim 10 wherein the nut rotating motor means is mounted on the block member.

\* \* \* \* \*